United States Patent
Meehan et al.

(10) Patent No.: US 11,194,043 B2
(45) Date of Patent: Dec. 7, 2021

(54) RADAR FOR WEATHER DETECTION AND DYNAMIC CONTROL AND ACTUATION OF VEHICLE SYSTEMS

(71) Applicant: Analog Devices International Unlimited Company, Limerick (IE)

(72) Inventors: Peter Meehan, Mungret (IE); Brian O'Mara, Lisnagry (IE); Paulo Ricardo Voiola Roque, Ennis (IE); Tai Quoc Duong, Limerick (IE); Wenmei Wang, Reading (GB); Michael John Lambe, Nenagh (IE); Piyush Sharma, Newbury (GB); Pierce Michael Anthony McEvoy, Dooradoyle (IE); Richard Donal Mackey, Cappamore (IE); Jiri Holas, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 603 days.

(21) Appl. No.: 15/874,819

(22) Filed: Jan. 18, 2018

(65) Prior Publication Data
US 2019/0219691 A1    Jul. 18, 2019

(51) Int. Cl.
*G01S 13/95* (2006.01)
*G01S 13/86* (2006.01)
(Continued)

(52) U.S. Cl.
CPC .......... *G01S 13/951* (2013.01); *B60W 30/09* (2013.01); *B60W 30/14* (2013.01);
(Continued)

(58) Field of Classification Search
CPC .. B60W 30/09; B60W 30/14; B60W 2420/42; B60W 2420/52; B60W 2555/20;
(Continued)

(56) References Cited

U.S. PATENT DOCUMENTS 6,262,410 B1    7/2001    Stam et al.
7,343,234 B2    3/2008    Kameyama
(Continued)

FOREIGN PATENT DOCUMENTS

CN    103270780 A    8/2013
CN    104199034    12/2014
(Continued)

OTHER PUBLICATIONS

Fuchs, Simone, et al. "Context-awareness and collaborative driving for intelligent vehicles and smart roads." 1st International Workshop on ITS for an Ubiquitous ROADS. 2007, 7 pages.
(Continued)

*Primary Examiner* — Peter D Nolan
*Assistant Examiner* — Demetra R Smith-Stewart
(74) *Attorney, Agent, or Firm* — Knobbe, Martens, Olson & Bear, LLP (57) ABSTRACT

Aspects of this disclosure relate to controlling one or more vehicle systems based on a determined weather condition. In some embodiments, a radar system can be mounted on a vehicle and can collect weather data by receiving electromagnetic signals. A weather condition can be determined based on the collected weather data, and a vehicle system can be controlled based on the determined weather condition, such as vehicle lighting, windscreen wipers, or cruise control. In some embodiments, weather conditions can include fog, sleet, or smog. The weather condition can be determined by analyzing scattered reflections from incident microwaves and/or radio waves to determine a level of attenuation of the scattered electromagnetic energy indicative of a presence or absence of particles. A map can be displayed displaying the weather condition and controlling vehicle navigation systems. The collected weather data can
(Continued)

be compared with data from a LiDAR or camera system for reliability.

20 Claims, 9 Drawing Sheets

(51) Int. Cl.
*G01C 21/34* (2006.01)
*B60W 30/09* (2012.01)
*B60W 30/14* (2006.01)
*G01C 21/36* (2006.01)
*G01S 13/931* (2020.01)
*G01W 1/06* (2006.01)
*G01W 1/00* (2006.01)

(52) U.S. Cl.
CPC ..... *G01C 21/3415* (2013.01); *G01C 21/3694* (2013.01); *G01S 13/865* (2013.01); *G01S 13/867* (2013.01); *G01S 13/931* (2013.01); *G01W 1/06* (2013.01); *B60W 2420/42* (2013.01); *B60W 2420/52* (2013.01); *B60W 2555/20* (2020.02); *B60W 2556/00* (2020.02); *B60W 2710/30* (2013.01); *B60W 2720/10* (2013.01); *G01W 2001/006* (2013.01)

(58) Field of Classification Search
CPC ......... B60W 2556/00; B60W 2710/30; B60W 2720/10; G01S 13/951; G01S 13/865; G01S 13/867; G01S 13/931; G01C 21/3415; G01C 21/3694; G01W 1/06; G01W 2001/006
See application file for complete search history.

(56) References Cited

U.S. PATENT DOCUMENTS

| | | | |
|---|---|---|---|
| 8,686,872 B2 | 4/2014 | Szczerba et al. | |
| 8,731,815 B2 | 5/2014 | Cummings | |
| 8,836,572 B2 * | 9/2014 | Heilmann | G01S 13/931 |
| | | | 342/70 |
| 8,983,705 B2 | 3/2015 | Zhu et al. | |
| 9,213,090 B2 * | 12/2015 | Paoletti | G01S 13/04 |
| 9,445,057 B2 | 9/2016 | May et al. | |
| 9,469,307 B2 | 10/2016 | Solyom et al. | |
| 2011/0153742 A1 * | 6/2011 | Sloop | G08G 1/096775 |
| | | | 709/204 |
| 2012/0277952 A1 | 11/2012 | MacNeille et al. | |
| 2013/0194126 A1 * | 8/2013 | Paoletti | G01S 13/867 |
| | | | 342/55 |
| 2013/0304379 A1 * | 11/2013 | Fulger | G01C 21/3453 |
| | | | 701/533 |
| 2014/0247968 A1 | 9/2014 | Pavlic | |
| 2014/0309864 A1 * | 10/2014 | Ricci | G05D 23/1917 |
| | | | 701/36 |
| 2014/0324266 A1 | 10/2014 | Zhu et al. | |
| 2015/0061493 A1 | 3/2015 | Jeromin et al. | |
| 2017/0168495 A1 | 6/2017 | Wood et al. | |
| 2017/0307751 A1 * | 10/2017 | Rohani | G01S 17/89 |
| 2018/0106896 A1 * | 4/2018 | Rohani | G01S 13/89 |
| 2019/0195998 A1 * | 6/2019 | Campbell | G01S 13/89 |

FOREIGN PATENT DOCUMENTS

| | | | | |
|---|---|---|---|---|
| CN | 104516030 A | 4/2015 | | |
| CN | 104627069 | 5/2015 | | |
| CN | 204526986 | 8/2015 | | |
| CN | 105324287 A | 2/2016 | | |
| CN | 106240526 A | 12/2016 | | |
| CN | 106828491 A | 6/2017 | | |
| CN | 106918849 A | 7/2017 | | |
| DE | 10136138 A1 * | 2/2003 | ........... | B60S 1/0859 |
| EP | 2743130 A1 | 6/2014 | | |
| JP | 2008/006936 A | 1/2008 | | |
| JP | 2013/543973 A | 12/2013 | | |
| JP | 2014/215237 A | 11/2014 | | |
| JP | 2016/203826 A | 12/2016 | | |
| JP | 2017/194487 A | 10/2017 | | |
| KR | 10-2013-0127989 A | 11/2013 | | |
| KR | 10-2015-0141190 A | 12/2015 | | |
| WO | WO 2012/062760 A1 | 5/2012 | | |
| WO | 2014152339 A1 | 9/2014 | | |
| WO | WO 2014/168851 A1 | 10/2014 | | |

OTHER PUBLICATIONS

Kurihata, Hiroyuki, et al. "Rainy weather recognition from in-vehicle camera images for driver assistance." Intelligent Vehicles Symposium, 2005. Proceedings. IEEE. IEEE, 2005, 6 pages.
Matthias Bauer-Pfundstein, MIRA-36 Cloud Radar Observation of Fog, Erad 2012—The Seventh European Conference on radar in Meteorology and Hydrology, Jun. 3, 2012, 6 pages.
Japanese Office Action dated Feb. 10, 2020 for JP Patent Application No. 2019-005904 in 3 pages.
Second Japanese Office Action dated Nov. 9, 2020 for Japanese Patent Application No. 2019-5904 in 8 pages.

* cited by examiner

FIG.4B
Detect Fog-Data to Cloud and Use in Weather Maps

FIG. 4A
Detect Fog and Actuate Lights

FIG. 4D

Vehicle to Mobile Weather platform + Actuate Street Light or Signage

FIG. 4C

Vehicle to Mobile Weather Platform

RADAR FOR WEATHER DETECTION AND DYNAMIC CONTROL AND ACTUATION OF VEHICLE SYSTEMS

FIELD OF DISCLOSURE

The present disclosure relates to weather detection and control of vehicle systems.

BACKGROUND

Vehicles can include one or more vehicle systems. For example, a vehicle can include a fog light system, lighting system, and/or window wiper system. The vehicle systems can play an important role in driving safety, including the safety of the driver of the vehicle, driver of other vehicles, passengers, and pedestrians. A window wiper vehicle system can keep water, snow, or dirt from building up on a windshield. A lighting and a fog light system can provide visibility at night time and can be a signal to other drivers.

SUMMARY

The innovations described in the claims each have several aspects, no single one of which is solely responsible for its desirable attributes. Without limiting the scope of the claims, some prominent features of this disclosure will now be briefly described.

Various aspects of this disclosure include a system mounted on a vehicle to dynamically control operation of the vehicle based on detected weather data, the system comprising: a radar mounted on the vehicle and configured to collect weather data by receiving electromagnetic signals; a processor configured to: determine one or more weather conditions from the collected weather data; and dynamically control one or more vehicle systems based on the one or more weather conditions.

In some embodiments, the one or more weather conditions include one or more adverse weather conditions and comprise at least one of: fog, sleet or smog.

In some embodiments, to determine the one or more weather conditions comprises analyzing scattered reflections from incident microwaves or radio waves.

In some embodiments, analyzing scattered reflections comprise assessing the level of attenuation of the scattered electromagnetic energy to determine the presence of particles in the air indicative of visibility.

In some embodiments, analyzing scattered reflections comprise assessing the level of attenuation of the scattered electromagnetic energy to determine the absence of particles in the air indicative of visibility.

In some embodiments, the processor is further configured to generate a graphical user interface displaying a map of the location of the determined one or more weather conditions.

In some embodiments, the processor is further configured to generate a graphical user interface displaying a map of the location of the determined one or more weather conditions, wherein to dynamically control the one or more vehicle systems comprises dynamically controlling one or more vehicle navigation systems.

In some embodiments, dynamically controlling one or more vehicle navigation systems comprises alerting a user of the adverse weather condition.

In some embodiments, dynamically controlling one or more vehicle navigation systems comprises identifying an alternative route based on the location of the adverse weather condition.

Various aspects of this disclosure include a method for dynamically controlling an operation of a vehicle system based on collected weather data, the method comprising: collecting weather data from a radar mounted on a vehicle; and determining one or more weather conditions from the collected weather data; and dynamically controlling one or more vehicle systems based on the determined one or more weather conditions.

In some embodiments, dynamically controlling the one or more vehicle systems is performed without input from a user.

In some embodiments, dynamically controlling the one or more vehicle systems comprises at least one of: controlling car lighting, controlling windscreen wipers, or controlling cruise control.

In some embodiments, controlling car lighting comprises controlling at least one of: a front fog lamp, a rear fog lamp, or a headlamp.

In some embodiments, controlling car lighting comprises not performing an action on the vehicle's car lighting that would have otherwise been performed.

In some embodiments, the method further comprises correlating the collected weather data with data from at least one of: a LiDAR system or one or more on-board cameras mounted on the vehicle, to determine the one or more weather conditions.

Various aspects of this disclosure include a vehicle with dynamic control of one or more vehicle systems based on detected weather data, the vehicle comprising: a radar mounted on the vehicle and configured to collect weather data by receiving electromagnetic signals; a processor configured to: determine one or more weather conditions from the collected weather data; and control the one or more vehicle systems based on the one or more weather conditions.

In some embodiments, to determine one or more weather conditions comprises sending data related to the collected weather data to a cloud server, and receiving an indication of a weather condition from the cloud server.

In some embodiments, to control the one or more vehicle systems comprises controlling the intensity of a light system, wherein the light system comprises at least one of: a fog light system, a headlamp system, a front light system, or a rear light system.

In some embodiments, the radar is part of a collision avoidance system.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIGS. 4A-4D illustrate graphical user interfaces for controlling various systems according to some embodiments.

DETAILED DESCRIPTION

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

An autonomous or semi-autonomous vehicle can include a processor integrating multi-sensor navigation and positioning, intelligent decisioning, and control technology. Even non-autonomous vehicles can have some automation. Many traditional controllers for vehicle systems use manual user input. For example, a driver can drive during the day into fog, and forget to turn on his/her headlamps. As a result, the driver can place not only himself or herself in danger, but other drivers and pedestrians as well. Furthermore, there may be weather conditions that the user cannot be aware of, such as sleet further down the road. Drivers also may not be able to determine a measure of the weather condition, such as the density of the fog, to adjust the vehicle systems appropriately. Moreover, even if drivers are able to identify certain weather conditions, some drivers may not know how to respond to such weather conditions, such as turning on fog lights during fog conditions. Drivers may also forget to turn off certain safety features that can become a danger in different weather conditions, such as leaving on fog lights that beam into the vision of opposite traffic.

Traditional systems have not been efficient in preventing automobile crashes in fog-related accidents. Furthermore, autonomous vehicles often use cameras for navigation. However, cameras cannot see through fog. Moreover, fog lights are commonly misused by drivers, such as by forgetting to turn them on during fog conditions and/or forgetting to turn them off after leaving the fog. Some systems also enable a user to control the intensity of certain vehicle systems, such as the brightness of fog lights. However, these traditional systems can require users to manually change the intensity based on the user-perceived weather condition. Thus, the intensity control is not optimized and not autonomous based on weather conditions.

Systems and methods disclosed herein include a vehicle using a radar system for detection of a weather condition, and based on the detected weather condition, dynamically control and/or actuate one or more vehicle systems, such as fog lights, headlights, windscreen wipers, and the like. These vehicles can include cars, buses, trucks, and can include autonomous vehicles as well as non-autonomous vehicles.

In some embodiments, a radar system is used to transmit and receive electromagnetic signals. Such electromagnetic signals can be indicative of weather data. For example, electromagnetic signals can be transmitted from an automobile radar system, reflected off particles in the environment, and received by the automobile radar system. The radar system can detect and analyze weather data to determine a weather condition. In some embodiments, the same radar system can advantageously be used for both collision avoidance and for obtaining weather conditions.

In some embodiments, the analyzed weather data can be transmitted to a cloud server and/or employed for autonomous actuation of the vehicle's other systems. For example, weather data can be sent to a cloud server for mapping the location of potential weather-based driving hazards, such as sleet or fog.

In some embodiments, the collected weather data can be used locally to the vehicle. The radar system can collect weather data and/or the weather data can be assessed to determine a weather condition. Based on the weather condition, a vehicle's system can change an operation and/or determine not to change an operation. For example, a vehicle's windscreen wiper system can engage the windscreen wipers in response to a determination of wet weather. The fog light system can control the intensity of the fog lights in foggy conditions.

In some embodiments, the determined weather condition and/or the collected weather data can be used to ensure certain features are off or continue to operate. For example, the vehicle can continuously determine a weather condition. As such, fog lights can be turned on when a fog condition is detected. At a later time, if the fog condition disappears, the fog lights can be turned off. Advantageously, fog lights are not turned on when fog conditions are not present so that other drivers are not blinded by the fog lights and also to save power and bulb life.

In some embodiments, intensity of certain vehicle systems can be controlled based on a weather condition. For example, the fog lamps can be adjusted based on the fog condition. Advantageously, the optimal fog lamp intensity can be used to maximize safety for the driver. If certain weather conditions are present that suggest a need to reduce speed, a vehicle's cruise control system can reduce the speed of the vehicle in certain areas and/or prompt the driver to take control of the vehicle. For example, the vehicle's cruise control system can reduce the speed of a vehicle in response to bad visibility.

In some embodiments, a processor of the vehicle and/or a cloud server can correlate the collected weather data from a radar system with data from another system. In some embodiments, the collected weather data from a radar system can be used in conjunction with data from a camera system and/or a light detection and ranging (LiDAR) system, such as a laser-based LiDAR system. In some embodiments, collected weather data from a radar system can be used in conjunction with a camera to determine a vehicle's state of health. For example, if a camera detects fog whereas a radar system detects nothing, such circumstances may indicate that the camera needs to be cleaned. In some embodiments, collected weather data from a radar system can be cross-correlated to data from a different system to provide enhanced reliability and/or provide enhanced recommendations/measures of weather conditions.

Radar Detection System

Figure 1:
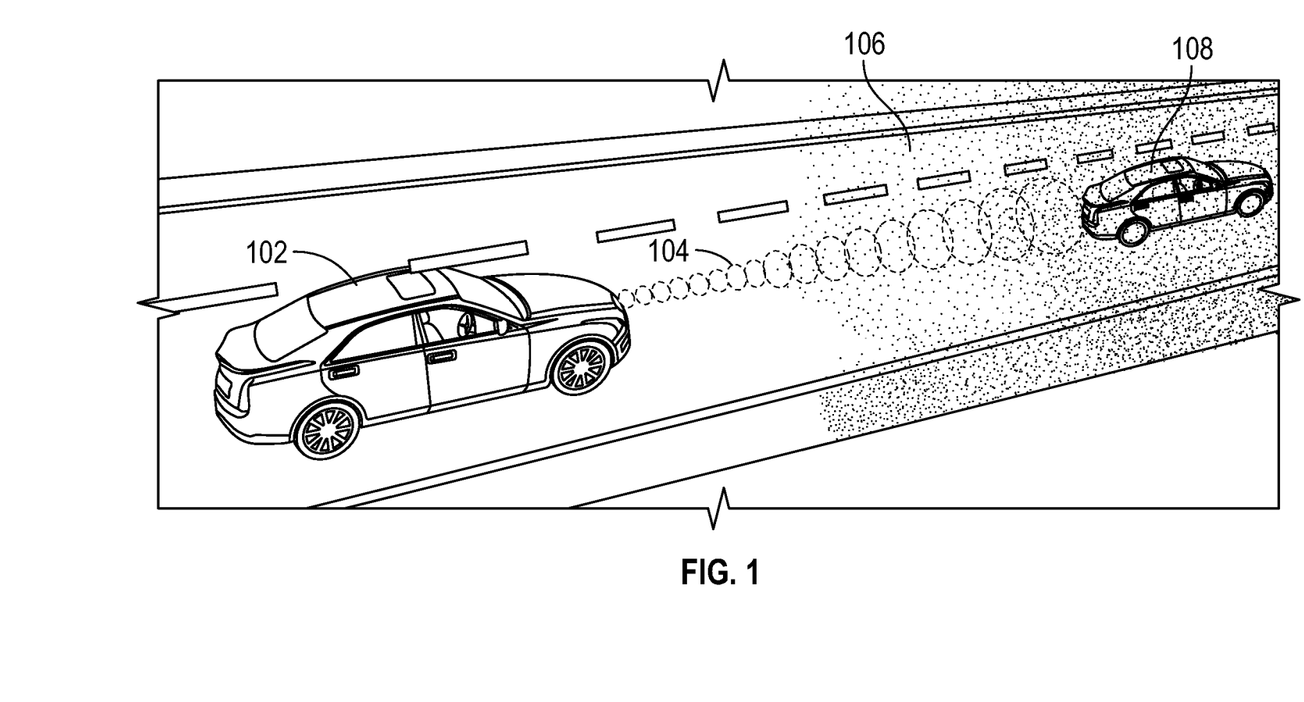
FIG. 1 is an illustration of a radar system mounted on a vehicle for receiving and/or transmitting electromagnetic signals according to some embodiments.

In some embodiments, a radar system is mounted onto or integrated with a vehicle. The radar system can transmit and/or receive electromagnetic reflections. FIG. 1 is an illustration of a radar system mounted on a vehicle for receiving and/or transmitting electromagnetic signals according to some embodiments. The radar system that is mounted on a vehicle 102 can detect the location of another vehicle 108, such as another vehicle located in front of the vehicle with the radar system. Furthermore, the radar system can detect weather conditions, such as a fog condition 106.

An antenna array of the radar system can transform electromagnetic signal into electromagnetic waves 104 that can broadcast a radiation pattern and/or can produce an electrical signal in response to receiving electromagnetic waves. This radiation pattern can be used to transmit and receive signals.

The transmitted and/or received signals of an antenna array can be assessed to determine characteristics of objects. For example, the time between a transmitted signal and a received signal can be indicative of a distance of the object the signal. The frequency of the received signal can indicate the direction of travel of the object.

In some embodiments, the electromagnetic reflections to be assessed can be created by a radar incident wave. The radar incident wave can be altered by the presence of droplets in the air. The droplets can be sufficiently smaller than its wavelength. A radar system that operates at high frequency can be sensitive to detecting these droplets. For example, a radar system that operates in at least 70-80 GHz can be used to detect fog based on reflections off of water droplets. Other bands can be used. Advantageously, a relatively small radar system can be implemented to detect fog over weather radars that use relatively large antenna arrays and high transmission power to transmit over long distances. Furthermore, the radar system of the present disclosure can be mounted onto a vehicle in contrast to a weather radar that is typically too large to mount on a relatively small vehicle, such as a passenger vehicle. Moreover, the radar system of the present disclosure can be angled at various directions, such as in front of the vehicle, whereas a weather radar functions by being directed toward the sky to see reflections.

In some embodiments, the power of the received signal can be attenuated based on a water droplet concentration in the atmosphere. For example, the water droplet concentration can be higher in fog conditions than in non-fog conditions. Thus, the received signal can be attenuated in accordance with a higher water droplet concentration. In addition, the power attenuation can be used as an indication of the intensity of the weather condition. For example, a certain power attenuation level can indicate a particular density of fog. Advantageously, the vehicle systems can be controlled based on the intensity. The window wipers can be controlled to wipe faster during heavy rain than in light rain conditions.

In some embodiments, the electromagnetic waves emitted by the radar system are assessed to determine weather conditions. For example, fog can result in a scattering effect of electromagnetic waves emitted by the radar system in the presence of water droplets. The power of the reflected signals can be used to determine a presence, an absence, and/or a density of a fog.

Radar Detection of Incident Rays

Figure 2A:
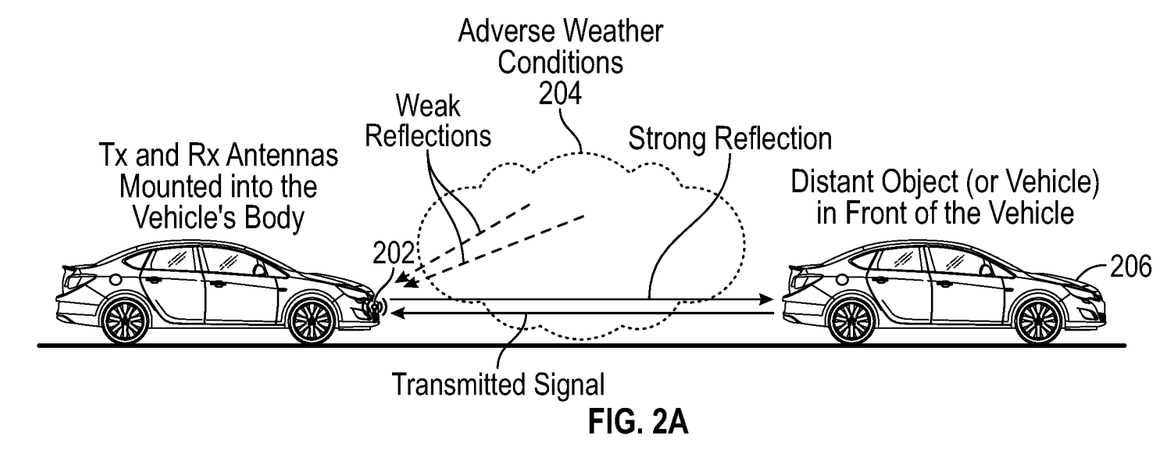
FIGS. 2A and 2B are illustrations of a transmitter and receiver radar system mounted on a vehicle according to some embodiments.
Figure 2B:
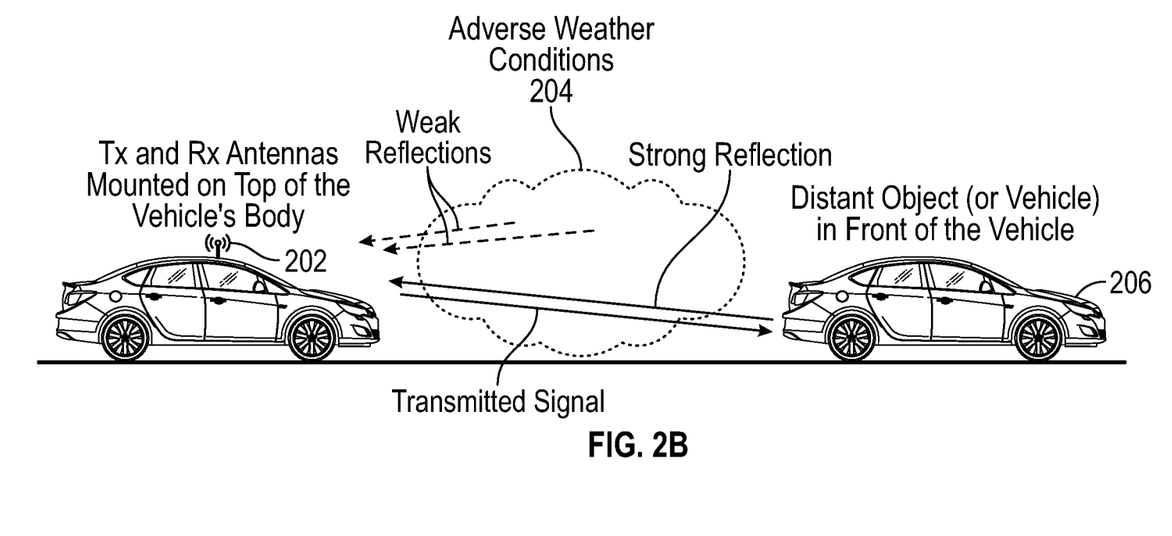

In some embodiments, a radar system mounted onto a vehicle can detect signals from weather conditions and other vehicles and other objects. The radar system can be mounted on the vehicle in any suitable position(s) for detecting one or more adverse weather conditions. FIGS. 2A and 2B are illustrations of a transmitter and receiver radar system mounted on a vehicle according to some embodiments. In some embodiments, one or more antenna elements 202 can be mounted onto the vehicle. A transmitter antenna array and/or a receiver antenna array can comprise the one or more antenna elements 202. In an embodiment, the one or more antenna elements 202 can be external to the vehicle. For example, the one or more antenna elements 202 can be external to the vehicle, can transmit electromagnetic energy toward a weather condition 204, and/or received by one or more antenna elements 202 mounted onto a vehicle. FIG. 2A illustrates one or more antenna elements 202 mounted on the front of the vehicle according to some embodiments. FIG. 2B illustrates one or more antenna elements 202 mounted on the top of the vehicle according to some embodiments.

In some embodiments, a single transceiver can comprise the one or more antenna elements 202. In alternative embodiments, one or more antenna elements 202 can be disposed on different antenna arrays.

In some embodiments, the one or more antenna elements 202 can transmit an electromagnetic signal. The electromagnetic signal can be reflected from weather conditions 204. A weaker, back-scattered wave can be reflected off the weather condition 204 and received by the one or more antenna elements 202.

In some embodiments, the electromagnetic signal can be reflected off of another vehicle and/or other object 206. The receiver antenna array can be placed in front of the vehicle such that the received signal can indicate that the other vehicle and/or other object 206 is at a distance in front of the vehicle. In some embodiments, the receiver antenna array can be positioned on different parts of the vehicle to indicate direction of the other vehicle and/or other object 206. A stronger reflection of the incident ray can be received by the one or more antenna elements 202.

In some embodiments, the receiver antenna array can differentiate between weather condition signals and other signals (such as signals reflecting off of other vehicles and/or objects 206). The receiver antenna array can differentiate between weather condition signals and other signals based on the received signal strength. For example, the signal reflected from weather conditions 204 can be weaker than signals reflected off of other vehicles and/or objects 206.

Flowchart for Determining Weather Condition and Controlling Vehicle System

Figure 3:
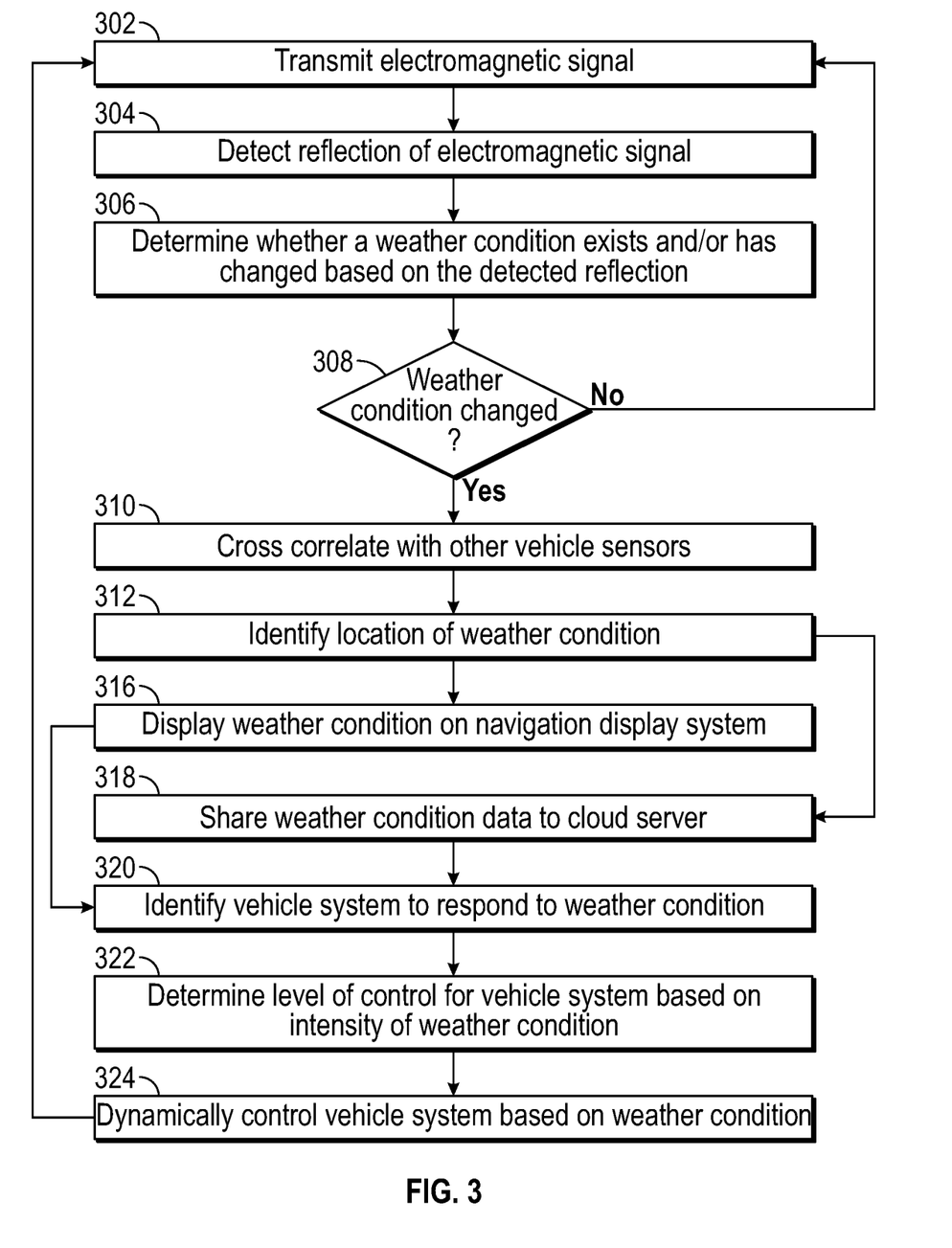
FIG. 3 is a flow diagram for determining weather conditions and dynamically controlling vehicle systems according to some embodiments.

In some embodiments, a vehicle can include dynamic control of one or more vehicle systems based on detected weather data. FIG. 3 is a flow diagram for determining weather conditions and dynamically controlling vehicle systems according to some embodiments.

The flow diagram starts at block 302 where the transmitter antenna array can transmit an electromagnetic signal. The electromagnetic signal can be transmitted from the vehicle. The electromagnetic signal can propagate from the vehicle to a distance from the vehicle, such as from the front of the vehicle.

In block 304, the receiver antenna array can receive the electromagnetic signal. The received electromagnetic signal can be a reflected electromagnetic signal of the signal transmitted by the transmitter antenna array. The receiver antenna array can detect a reflection and measure the power levels. Then, a processor can determine a power attenuation level of the reflected electromagnetic signal.

In block 306, the power attenuation levels of the reflected electromagnetic signals can be assessed to determine whether a weather condition exists and/or has changed. The weather condition can be determined based on the power attenuation levels of the reflected electromagnetic signals. For example, a weather condition can include fog, rain, sleet, snow, hail, smog, and/or the like.

In block 308, if it is determined that the weather condition has not changed and/or does not exists, the flow diagram can return to block 302. In block 308, if it is determined that the weather condition has changed and/or does exist, other data can be cross-correlated to provide additional context at block 310. For example, data from other sensors of the vehicle, such as LiDAR and/or camera data, can be used to double check or corroborate the weather condition. Data from other sensors of the vehicle can provide enhanced visibility into the weather condition, such as the weather condition intensity.

In block 312, the location of the weather condition can be identified. As such, the location of the weather condition can be transmitted to a navigation system. For example, the weather condition can be displayed on a route navigation display. The weather condition can be displayed for the vehicle that detected the weather condition in block 316 and/or other vehicles.

In some embodiments, vehicles can communicate with one another and/or to a cloud server that indicates the location of the weather condition. Advantageously, the weather data can be sent to a server for mapping the location of potential weather-based driving hazards, such as sleet or fog, and/or can be shared to with other vehicles on the road at block 318. The gathered weather condition data can help road users plan their routes in advance avoiding dangerous poor visibility conditions by sending the gathered fog data from various vehicles on the road to a cloud server. Such a mechanism can provide live fog data to satellite navigation systems and smartphone apps to alert the drivers already on the road and/or drivers ready to embark on a route.

In block 320, the one or more vehicle systems to respond to the weather condition can be identified. For example, for rain, the window wiper system and/or the fog lighting system can be identified. For fog, the fog lighting system can be identified. At block 322, the level of control can be identified based on the intensity of the weather condition. For example, in thicker fog, the fog lighting system can be controlled to actuate brighter lights. In areas of relatively bad visibility, the cruise control system can be identified to reduce speed and/or prompt the driver to take control of the vehicle. At block 324, the one or more vehicle systems can be dynamically controlled based on the weather condition and/or the intensity of the weather condition. Furthermore, a vehicle's state of health can be determined and a notification can be sent, such as to the driver and/or the vehicle company. Advantageously, if the camera system detects fog whereas the radar system does not detect fog, a notification can be sent to the driver to check the camera to see whether the camera needs cleaning.

Graphical User Interfaces for Controlling Various Systems

Figure 4A:
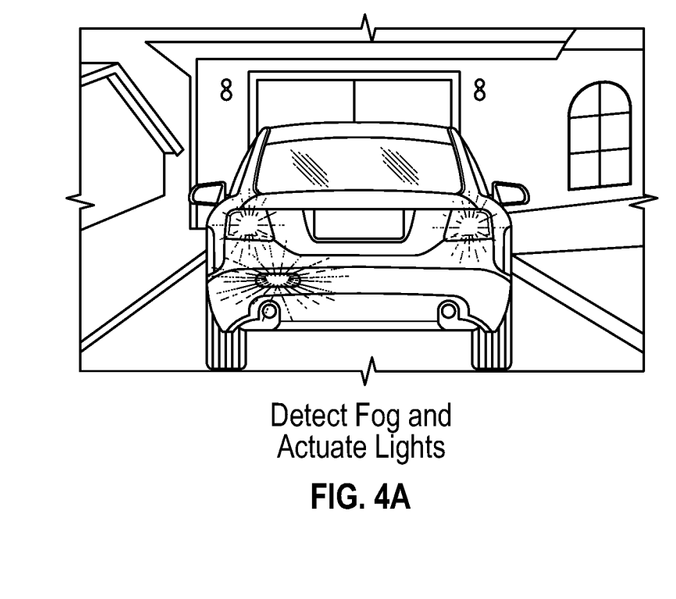
FIG. 4A illustrates a graphical user interface for controlling a fog lighting system according to some embodiments.

In some embodiments, weather condition data can be used to control one or more systems. FIGS. 4A-4D illustrate examples of use cases and/or graphical user interfaces for various systems according to some embodiments. FIG. 4A illustrates a use case for controlling a fog lighting system according to some embodiments. In some embodiments, the detected weather condition data can be used to control one or more systems of the vehicle. For example, the fog lighting system can turn on when a fog condition is detected, and/or turn off when a fog condition is not detected. In some embodiments, the various systems can be adjusted based on the intensity and/or type of the weather condition. For example, the light intensity of the fog lighting system can be adjusted based on the intensity of the fog condition (e.g. the concentration of the water droplets).

Figure 4B:
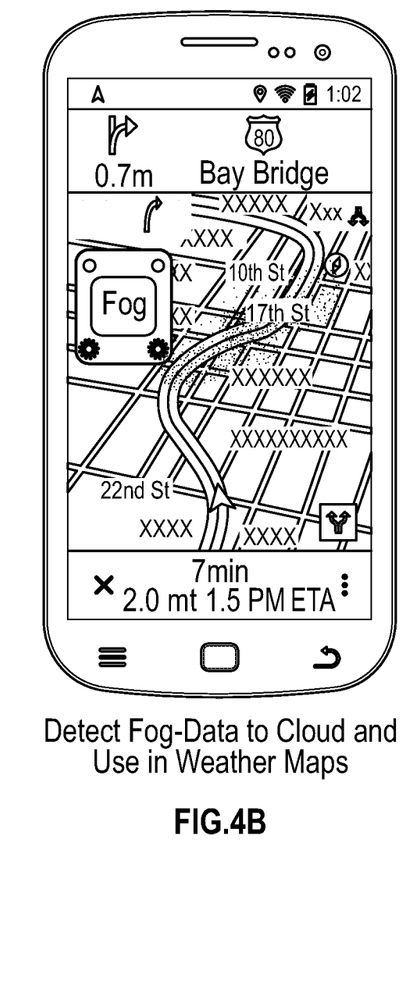
FIG. 4B illustrates a graphical user interface for controlling a navigation display system according to some embodiments.

FIG. 4B illustrates a graphical user interface for controlling a navigation display system according to some embodiments. In some embodiments, a navigation display can be adjusted based on the detected weather condition. For example, an icon can be displayed that indicates the fog condition. For example, a "Fog" icon can be displayed when the radar array detects fog for the vehicle system. An audible alert or warning can also or alternatively be provided.

Figure 4C:
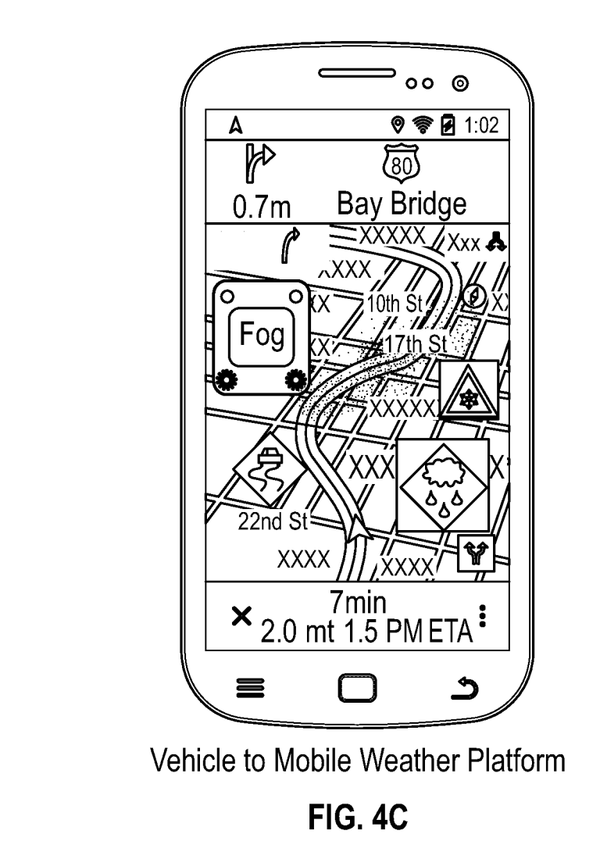
FIG. 4C illustrates a graphical user interface for sharing weather condition data with a navigation cloud system according to some embodiments.

FIG. 4C illustrates a graphical user interface for sharing weather condition data to a navigation cloud system according to some embodiments. In some embodiments, weather condition data can be shared across multiple vehicles and/or multiple platforms. For example, one vehicle can detect fog in a first location, a second vehicle can detect slippery roads in second location, a third vehicle can detect snow in a third location, a fourth vehicle can detect rain in a fourth location, and/or the like. The locations of the weather conditions can be collected by a cloud server. The cloud server can transmit the type, location, and/or intensity of the weather conditions to navigation systems of one or more vehicles. Advantageously, the vehicles can get a fuller picture of the weather condition collectively than if the vehicles were each relying only on their own data. The vehicles can identify weather condition data and take appropriate preemptive measures. For example, the vehicles can avoid a certain route based on the weather condition. In some alternative embodiments, the vehicles can determine a different route based on a weather condition and the condition of the vehicle. For example, if the vehicle is identified to have tires with thin treads, the vehicle can avoid routes with weather conditions of snow or sleet.

Figure 4D:
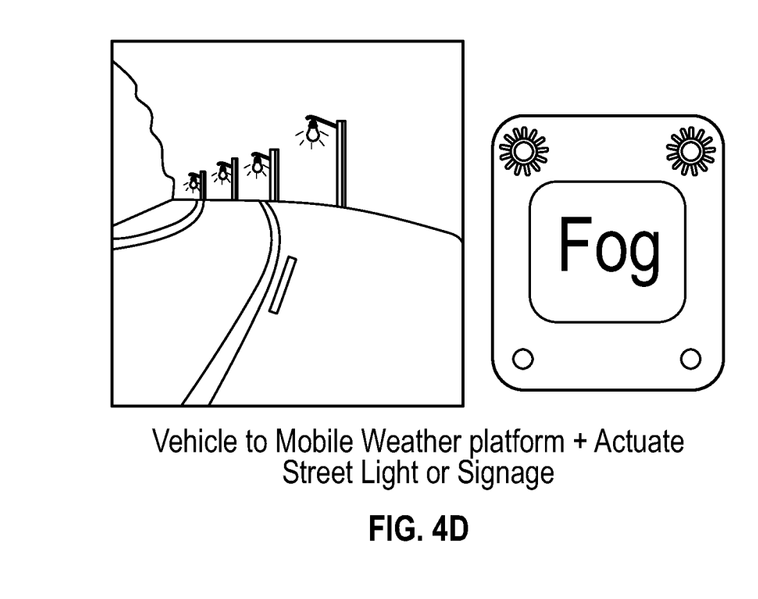
FIG. 4D illustrates a graphical user interface for controlling systems external to the vehicle according to some embodiments.

FIG. 4D illustrates a use case for controlling systems external to the vehicle according to some embodiments. In some embodiments, the weather condition data can be used to control systems external to vehicles. For example, street lights and/or street signs can be adjusted based on weather conditions. If a fog condition is detected, street lights can be turned on to guide a driver through the road. If a fog condition is detected, street signs can indicate to a driver that a fog condition is up ahead.

Flowchart for Dynamically Controlling Vehicle System Based on Time Frame

Figure 5:
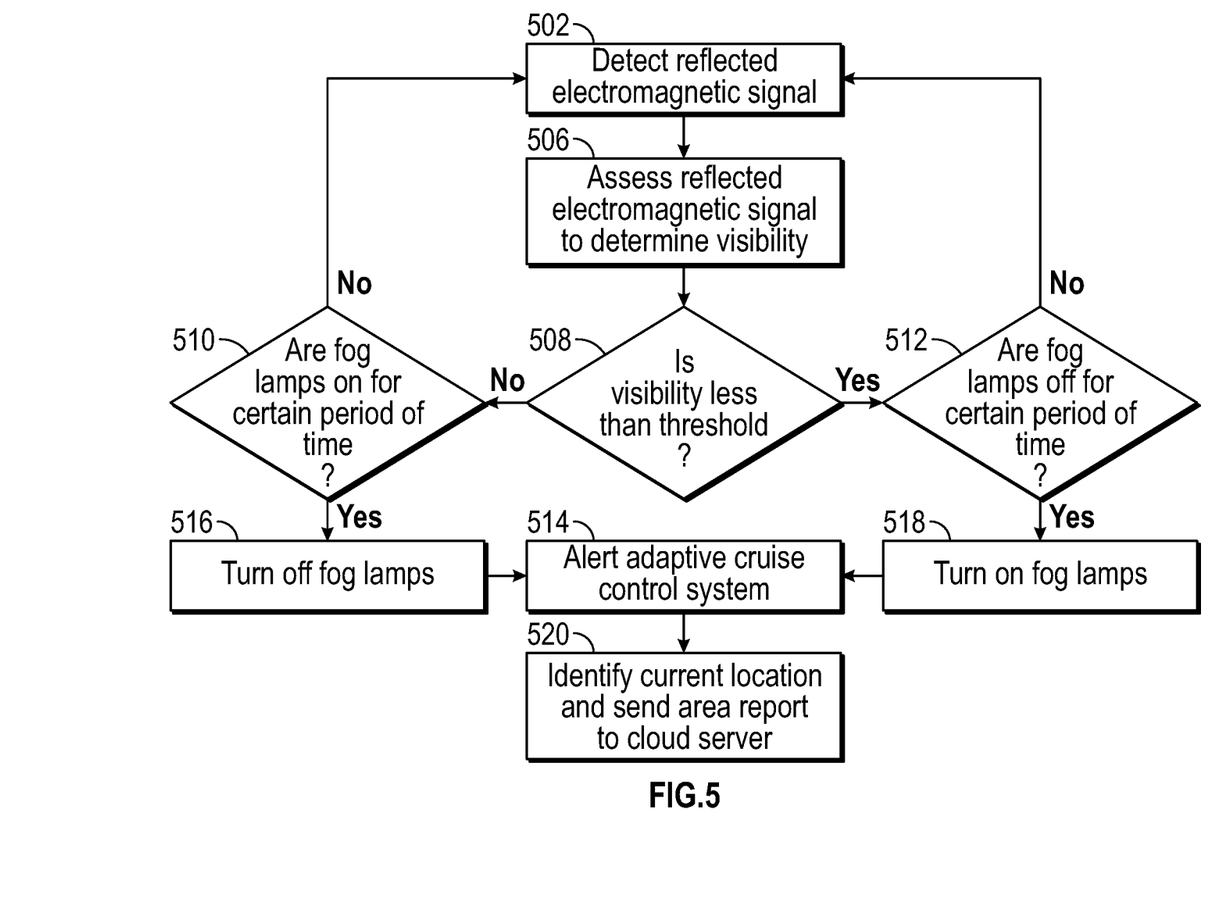
FIG. 5 is a flow diagram for dynamically controlling a fog lighting system based on a time frame according to some embodiments.

In some embodiments, a dynamic control of one or more vehicle systems can include decisioning based on a time frame. FIG. 5 is a flow diagram for dynamically controlling a fog lighting system based on a time frame according to some embodiments. At block 502, the radar system mounted on a vehicle can detect a reflected electromagnetic signal. For example, an electromagnetic signal can be transmitted from the vehicle and reflected off water droplets.

In block 506, the reflected electromagnetic signal can be assessed to determine visibility on the road. For example, based on the water droplet concentration levels in the atmosphere, the reflected signal can be attenuated in power. Based on this attenuation, a fog condition and/or an intensity of the fog condition can be determined. If it is determined at block 508 that visibility is less than a certain threshold (e.g. indicating a certain intensity in the fog), then the flow diagram can continue to block 512. The particular threshold can be readily determined by one or ordinary skill in the art and can be, for example, retrieved from a memory of the radar system. If it is determined at block 508 that visibility is not less than a certain threshold, then the flow diagram can continue to block 510.

At block 510, if the conditions for turning the fog lamps on have been present for a certain period of time, then at block 516, the fog lamps of the fog lighting system can be turned off. The applicable period of time can vary in a broad range and be readily determined by one of ordinary skill in the art. If the conditions for turning on the fog lamps have not been present for a certain period of time at block 510, then the flow diagram can continue to block 502. In some embodiments, the period of time is determined based on a counter, and at block 510 if the conditions for turning on the fog lamps have not been present for a certain period of time, the counter can be incremented.

At block 512, if the fog lamps have been off for a certain period of time, then at block 518, the fog lamps of the fog lighting system can be turned on. If the fog lamps have not been off for a certain period of time at block 512, then the flow diagram can continue to block 502. In some embodiments, the period of time is determined based on a counter, and at block 512 if the fog lamps have not been turned off for a certain period of time, the counter can incremented. Advantageously, the fog lighting system can be controlled with a buffer, such as a minimum on time, such that the fog lighting system does not turn off and on in response to flickering reflection readings. In alternative embodiments, signal processing methods can be implemented. For example, a moving average of the visibility levels can be implemented.

At block 514, the adaptive cruise control system can be alerted. For example, the adaptive cruise control system can reduce the speed if fog lamps are turned on at block 518, and/or the adaptive cruise control system can return to the previously set speed if fog lamps are turned off at block 516.

At block 520, the vehicle can transmit the current location, weather condition, and/or intensity of the weather condition to a cloud server. The cloud server can aggregate weather condition data and/or transmit the weather condition data to other vehicles. Advantageously, vehicles can receive weather condition data for locations other than the location of the vehicle. Vehicles can identify best routes, future dangerous weather conditions, and/or make preemptive adjustments in preparation for the weather conditions.

Figure 6:
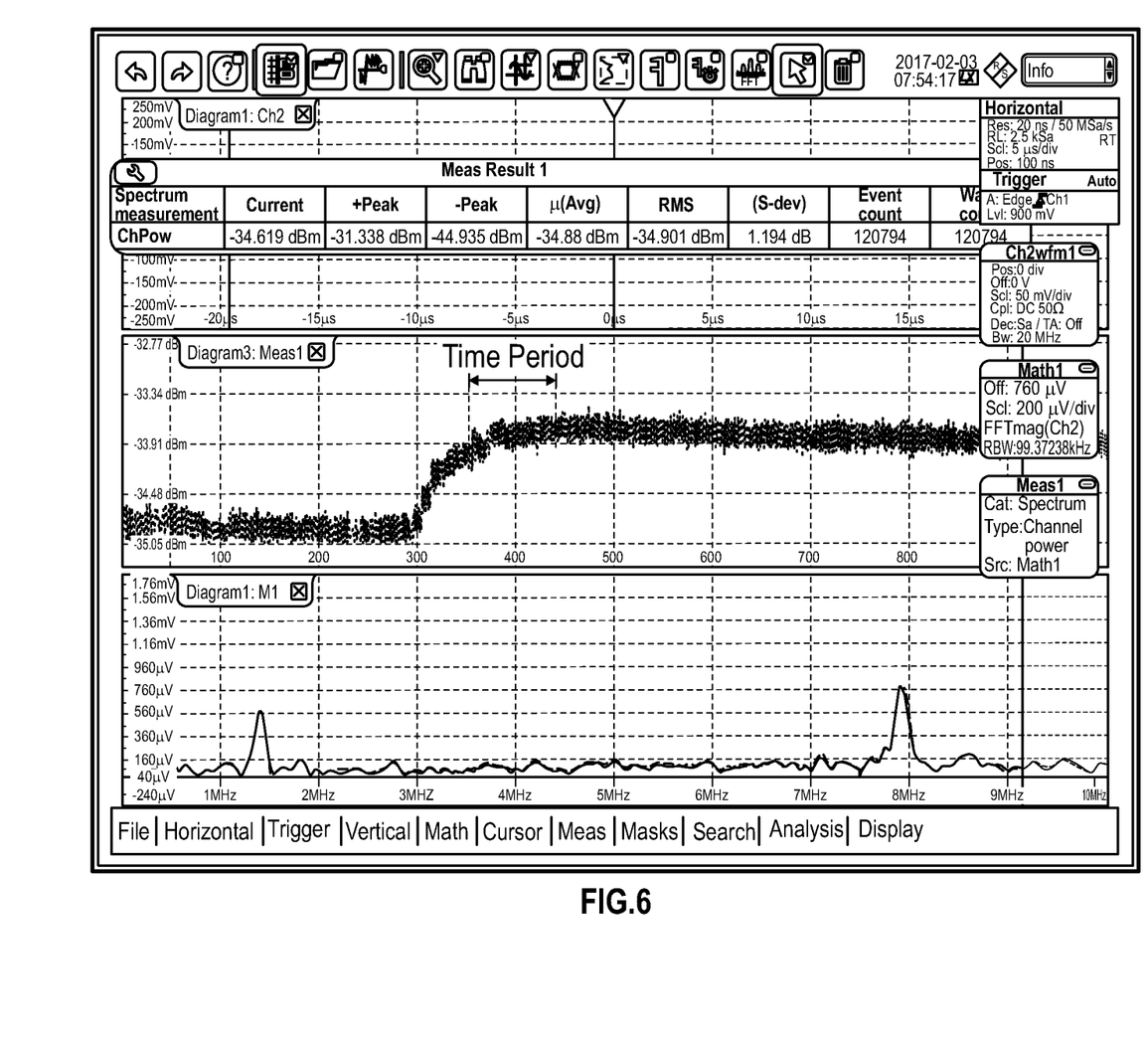
FIG. 6 is a power measurement diagram over time for determining weather conditions according to some embodiments.

FIG. 6 is a power measurement diagram over time for determining weather conditions according to some embodiments. In some embodiments, the power measurements can be determined. As shown, the power levels increased and stayed at the increased power level for a certain time period. After the power levels increased for a certain time period, the one or more vehicle systems can be dynamically controlled, such as the example disclosed in FIG. 5. Advantageously, spikes in power levels can be ignored, and power level changes over a period of time can be required to dynamically control the one or more vehicle systems.

Dynamic Control of Various Vehicle Systems

Figure 7:
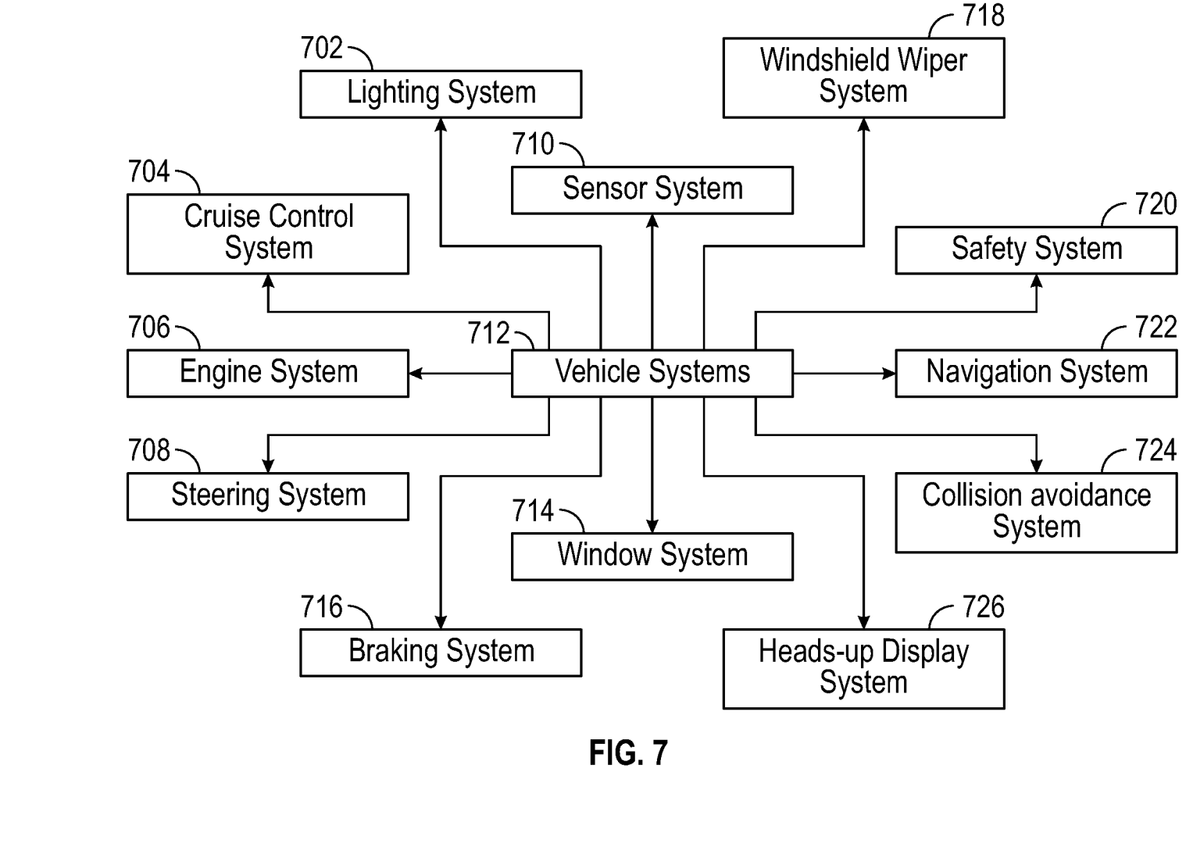
FIG. 7 is a diagram illustrating various vehicle systems according to some embodiments.

In some embodiments, a plurality of vehicle systems can be dynamically controlled based on the determination of and/or the intensity of detected weather conditions. FIG. 7 is a diagram illustrating various vehicle systems according to some embodiments. A vehicle can include one or more vehicle systems 712 that can be controlled based on weather condition.

In some embodiments, the vehicle system can include a lighting system 702. The lighting system 702 can include fog lights, head lights, rear lights, auxiliary lamps, front lights, lateral lights, identification lights, overtake lights, marker lights, turn lights, and/or the like. The lighting system 702 can include an adjustable control for dimming and/or brightening the intensity of the lights. The control of the lighting system 702 can be based on the intensity of the weather condition. For example, the lighting system 702 can increase and/or decrease the intensity of the lights with changes in intensity in the fog conditions. The lighting system 702 can include adjustment of certain characteristics of the lights, such as color, on/off and/or flashing options, and/or the like.

In some embodiments, the one or more vehicle systems can include a cruise control system 704. The cruise control system 704 can include a speed control, an autocruise function, an auto-drive function, and/or the like. The cruise control system can be adaptive, for example, for use in autonomous vehicles. The cruise control system 704 can apply braking and/or dynamically set certain speeds and/or accelerations for a vehicle. Based on the weather condition, the cruise control system 704 can control the speed at which the vehicle is traveling, such as to reduce speed in hazardous conditions.

In some embodiments, the one or more vehicle systems can include an engine system 706. The engine system 706 can include control for a certain type of driving. For example, in hazardous weather conditions, the engine system 706 can change from a sports mode to a safety mode, where the acceleration of the vehicle is reduced.

In some embodiments, the one or more vehicle systems can include a steering system 708. If a certain location is associated with a weather condition, the one or more vehicle systems can steer the vehicle away from the weather condition using the steering system 708.

In some embodiments, the one or more vehicle systems can include a braking system 716. If a relatively hazardous weather condition suddenly occurs several meters in front of the vehicle, the braking system 716 can apply brakes to stop the vehicle immediately and/or before reaching the location of the very hazardous weather condition.

In some embodiments, the one or more vehicle systems can include a window system 714. For example, if it starts raining hard, the driver may not realize that one of the back windows are open. The window system 714 can close all windows of the vehicle after detecting a rain condition. If the weather includes a large hail storm, the window system 714 can close all windows of the vehicle to prevent harm to the driver and/or the passengers from hail entering into the vehicle.

In some embodiments, the one or more vehicle systems can include a heads-up display system 726 and/or a navigation system 722. The heads-up display system 726 and/or the navigation system 722 can include a change to a route and/or recommendation of a route to avoid the weather condition. The heads-up display system 726 and/or the navigation system 722 can display the weather condition, such as placing an icon representative of the weather condition in an affected location.

In some embodiments, the one or more vehicle systems can include a collision avoidance system 724, a safety system 720, and/or a sensor system 710. The collision avoidance system 724 can include a precrash system, a forward collision warning system, a collision mitigation system, and/or the like. In some embodiments, the safety system 720 can include driver assistance, such as emergency brake assistance systems, obstacle detection sensor systems, traction control systems, anti-lock braking systems, lane departure warning systems, and/or the like. Advantageously, the collision avoidance system 724, the safety system 720, a sensor system 710, and/or other vehicle systems can become more sensitive to data when a hazardous weather condition is detected. For example, data from LiDAR, radar, and/or cameras can be assessed in further detail and/or have lower thresholds to trigger certain actions in light of a weather condition.

In some embodiments, the one or more vehicle systems can include a windshield wiper system 718. The windshield wiper system 718 can include a mechanism to wipe snow, ice, debris, and/or the like from a windscreen or windshield, such as a windshield wiper. The windshield wiper system 718 can control the speed of the windshield wiper at several speeds and/or intermittent settings.

Flow Diagram for Interaction with Cloud Server

Figure 8:
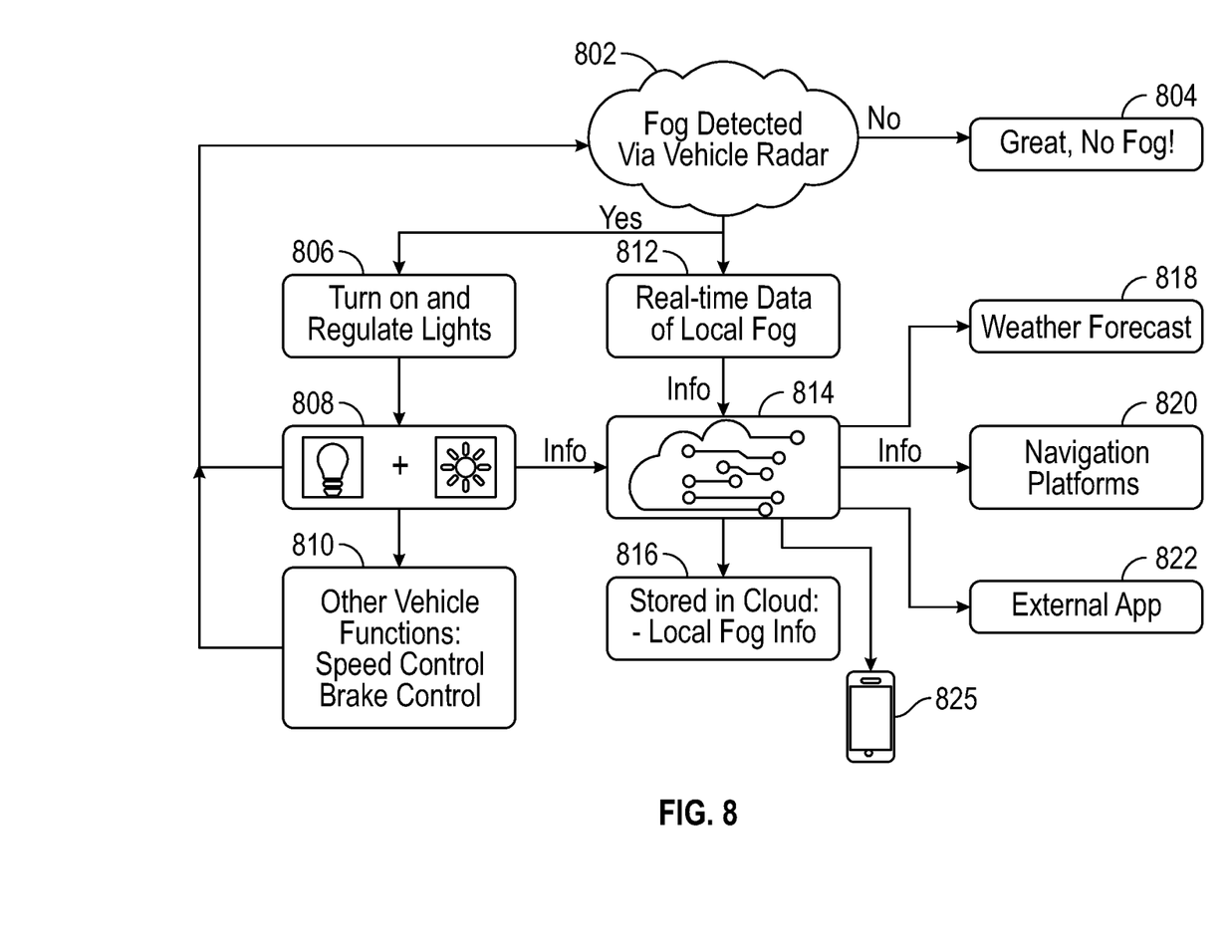
FIG. 8 is a flow diagram for interacting with the cloud server regarding weather conditions according to some embodiments.

In some embodiments, a vehicle can communicate with a cloud server regarding weather condition data. FIG. 8 is a flow diagram for interacting with the cloud server regarding weather conditions according to some embodiments. The flow diagram can begin in block 802 where fog is or is not detected via a vehicle radar. If no fog is detected, the cloud server is notified that no fog is detected at block 804.

In block 802 if fog is detected, at block 806, the fog lighting system can be controlled to turn on and regulate the intensity of the lights depending on the intensity of the weather condition. In block 808, the lighting information is collected and the information is sent to the cloud server at block 814. Furthermore, other vehicle functions are dynamically controlled based on the weather condition in block 810, such as speed control and brake control. At block 802 if fog is detected, at block 812, real-time local fog data can be collected and sent to the cloud server at block 814.

The cloud server can transmit the local fog data to other devices. For example, the cloud server can transmit the local fog data to a weather forecast system and/or to road studs (e.g. cat's eyes and/or retroreflective safety devices) at block 818. As such, other people and/or devices can get real-time weather forecast information. The cloud server can transmit the local fog weather to a navigation platform at block 820. The navigation platform can alert drivers of a weather condition up ahead and/or make appropriate route changes for other drivers. In some embodiments, the cloud server can store the local fog information in the cloud server and associate the weather condition with a profile of the driver in block 816. In some embodiments, the cloud server can transmit the weather condition to a mobile device 825 and/or an external application 822.

Applications

Any of the principles and advantages discussed herein can be applied to other systems, not just to the systems described above. The elements and operations of the various embodiments described above can be combined to provide further embodiments. Some of the embodiments described above have provided examples in connection with transceiver integrated circuits. However, the principles and advantages of the embodiments can be used in connection with any other systems, apparatus, or methods that could benefit from any of the teachings herein. For instance, any of the principles and advantages discussed herein can be implemented in connection with any devices with a need for calibration of transmit and receive paths. Although the digital signal processor is described for both transmitting and receiving, the digital signal processor may be multiple processors (e.g., a separate digital signal processors for a transmitter and a receiver). Although embodiments describe connecting paths via a coupler, other suitable components can be used to connect signal paths.

Aspects of this disclosure can be implemented in various electronic devices. Examples of the electronic devices can include, but are not limited to, consumer electronic products, parts of the consumer electronic products such as semiconductor die and/or packaged modules, electronic test equipment, wireless communication devices, personal area network communication devices, cellular communications infrastructure such as a base station, etc. Examples of the consumer electronic products can include, but are not limited to, a mobile phone such as a smart phone, a wearable computing device such as a smart watch or an ear piece, a telephone, a television, a computer monitor, a computer, a router, a modem, a hand-held computer, a laptop computer, a tablet computer, a personal digital assistant (PDA), a microwave, a refrigerator, a vehicular electronics system such as an automotive electronics system, a stereo system, a DVD player, a CD player, a digital music player such as an MP3 player, a radio, a camcorder, a camera such as a digital camera, a portable memory chip, a washer, a dryer, a washer/dryer, peripheral device, a clock, road studs, etc. Further, the electronic devices can include unfinished products.

Conclusion

Unless the context requires otherwise, throughout the description and the claims, the words "comprise," "comprising," "include," "including," and the like are to generally be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. The word "or" in reference to a list of two or more items, is generally intended to encompass all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments have been described, these embodiments have been presented by way of example only, and are not intended to limit the scope of the disclosure. Indeed, the novel methods, apparatus, and systems described herein may be embodied in a variety of other forms; furthermore, various omissions, substitutions and changes in the form of the methods, apparatus, and systems described herein may be made without departing from the spirit of the disclosure. For example, circuit blocks described herein may be deleted, moved, added, subdivided, combined, and/or modified. Each of these circuit blocks may be implemented in a variety of different ways. The accompanying claims and their equivalents are intended to cover any such forms or modifications as would fall within the scope and spirit of the disclosure.

What is claimed is:

1. A system to dynamically control operation of one or more control systems of a vehicle based on detected weather data, the system comprising:
    a radar mountable on the vehicle and configured to collect weather data by receiving electromagnetic signals; and
    a processor configured to:
        process the collected weather data to determine one or more weather conditions local to the vehicle from the collected weather data;
        dynamically control the one or more vehicle systems based on the one or more weather conditions local to the vehicle; and
        generate a graphical user interface displaying a map of the location of the determined one or more weather conditions.

2. The system of claim 1, wherein the one or more weather conditions include one or more adverse weather conditions and comprise at least one of: fog, sleet or smog.

3. The system of claim 1, wherein to determine the one or more weather conditions comprises analyzing scattered reflections from incident microwaves or radio waves.

4. The system of claim 3, wherein analyzing scattered reflections comprise assessing the level of attenuation of the scattered electromagnetic energy to determine the presence of particles in the air indicative of visibility.

5. The system of claim 1, wherein to dynamically control the one or more vehicle systems comprises dynamically controlling one or more vehicle navigation systems.

6. The system of claim 5, wherein dynamically controlling one or more vehicle navigation systems comprises alerting a user of the adverse weather condition.

7. The system of claim 5, wherein dynamically controlling one or more vehicle navigation systems comprises identifying an alternative route based on the location of the adverse weather condition.

8. The system of claim 1, wherein the radar operates at a frequency of at least 70 gigahertz (GHz).

9. The system of claim 1, wherein to process the collected weather data comprises determining a water droplet concentration in the atmosphere.

10. A method for dynamically controlling an operation of a vehicle system based on collected weather data, the method comprising:
    collecting weather data from a radar mounted on or integrated with a vehicle;
    correlating the collected weather data with additional data to determine one or more weather conditions local to the vehicle from the collected weather data, wherein the additional data is from at least one of a LiDAR system or one or more on-board cameras; and
    dynamically controlling one or more vehicle systems based on the determined one or more weather conditions local to a vehicle.

11. The method of claim 10, wherein dynamically controlling the one or more vehicle systems is performed without input from a user.

12. The method of claim 10, wherein dynamically controlling the one or more vehicle systems comprises at least one of: controlling car lighting, controlling windscreen wipers, or controlling cruise control.

13. The method of claim 12, wherein controlling car lighting comprises controlling at least one of: a front fog lamp, a rear fog lamp, or a headlamp.

14. The method of claim 12, wherein controlling car lighting comprises not performing an action on the vehicle's car lighting that would have otherwise been performed.

15. A vehicle with dynamic control of one or more vehicle systems based on detected weather data, the vehicle comprising:
    one or more vehicle control systems comprising a light system, wherein the light system comprises at least one of: a fog light system, a headlamp system, a front light system, or a rear light system;
    a radar mounted on or integrated with the vehicle and configured to collect weather data by receiving electromagnetic signals; and
    a processor configured to:
        determine one or more weather conditions from the weather data collected by the radar; and
        control an intensity of the light system based on the one or more weather conditions.

16. The vehicle of claim 15, wherein to determine one or more weather conditions comprises sending data related to the collected weather data to a cloud server, and receiving an indication of a weather condition from the cloud server.

17. The vehicle of claim 15, the radar is part of a collision avoidance system.

18. A vehicle with dynamic control of one or more vehicle systems based on detected weather data, the vehicle comprising:
    one or more vehicle control systems;
    a radar mounted on or integrated with the vehicle and configured to collect weather data by receiving electromagnetic signals; and
    a processor configured to:
        determine one or more weather conditions from the weather data collected by the radar by at least causing transmission of data related to the collected weather data to a cloud server, and receiving an indication of a weather condition from the cloud server; and
        control the one or more vehicle systems based on the one or more weather conditions.

19. The vehicle of claim 18, wherein the radar operates at a frequency of at least 70 gigahertz (GHz).

20. The vehicle of claim 18, wherein the one or more vehicle control systems comprise a light system.

* * * * *